United States Patent
Yanagida et al.

(10) Patent No.: US 6,315,636 B1
(45) Date of Patent: Nov. 13, 2001

(54) LAPPING MACHINE, ROW TOOL, AND LAPPING METHOD

(75) Inventors: Yoshiaki Yanagida; Teruaki Nishioka; Koji Sudo; Shunsuke Sone; Tomokazu Sugiyama, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/483,906

(22) Filed: Jan. 18, 2000

(30) Foreign Application Priority Data

Apr. 21, 1999 (JP) .................................................. 11-113037

(51) Int. Cl.$^7$ ...................................................... B24B 49/00
(52) U.S. Cl. ................................ 451/11; 451/5; 451/278; 451/279
(58) Field of Search ........................... 451/41, 44, 212, 451/232, 272, 5, 278, 11, 279, 366, 387, 396, 405; 269/266, 58, 71, 91, 92

(56) References Cited

U.S. PATENT DOCUMENTS

| | | | |
|---|---|---|---|
| 3,863,395 | * | 2/1975 | Brown .................................. 451/272 |
| 4,457,114 | | 7/1984 | Hennenfent et al. . |
| 4,914,868 | | 4/1990 | Church et al. . |
| 5,117,589 | | 6/1992 | Bischoff et al. . |
| 5,203,119 | | 4/1993 | Cole . |
| 5,386,666 | * | 2/1995 | Cole ......................................... 451/5 |
| 5,607,340 | | 3/1997 | Lackey et al. . |
| 5,620,356 | | 4/1997 | Lackey et al. . |
| 5,816,899 | * | 10/1998 | Hart et al. ......................... 451/405 X |
| 5,899,793 | * | 5/1999 | Yanagida et al. ................. 451/405 X |
| 6,050,878 | * | 4/2000 | Kanzo et al. ............................ 451/5 |
| 6,074,283 | * | 6/2000 | Maeda et al. ........................... 451/5 X |
| 6,095,895 | * | 8/2000 | Fujita et al. .............................. 451/5 |

FOREIGN PATENT DOCUMENTS 9819828    5/1998   (WO) .

* cited by examiner

Primary Examiner—Joseph J. Hail, III
Assistant Examiner—Anthony Ojini
(74) Attorney, Agent, or Firm—Greer, Burns & Crain, Ltd.

(57) ABSTRACT

Disclosed herein is a lapping machine for lapping a row bar having a plurality of head sliders. The lapping machine includes a lap plate for providing a lapping surface, a row tool having a work surface for pressing the row bar against the lapping surface, and a mechanism for operating the row tool so that a given pressure distribution is produced between the row bar and the lapping surface. The row tool has a plurality of holes arranged along the work surface. The mechanism includes a plurality of pivoted links each having a load point where a force having a direction perpendicular to the work surface is applied to the row tool in each of the holes. Each of the pivoted links further has a support point as the fulcrum and an effort point where a force having a direction substantially parallel to the work surface is received. The ratio of a distance between the load point and the support point to a distance between the effort point and the support point is substantially constant. With this configuration, the spacing between any adjacent ones of the holes of the row tool can be easily reduced to thereby improve a working accuracy.

9 Claims, 18 Drawing Sheets

LAPPING MACHINE, ROW TOOL, AND LAPPING METHOD

BACKGROUND OF THE INVENTION

1. Field of the Invention

The present invention relates generally to a lapping machine, row tool, and lapping method for use in lapping a workpiece, and more particularly to a lapping machine, row tool, and lapping method suitable for mass production of magnetic heads uniform in quality.

2. Description of the Related Art

In a manufacturing process for a magnetic head, for example, a magnetic head thin film is formed on a substrate and next subjected to lapping, thereby making constant the heights of a magnetic resistance layer and a gap in the magnetic head thin film. The heights of the magnetic resistance layer and the gap are required to have an accuracy on the order of submicrons. Accordingly, a lapping machine for lapping the magnetic head thin film is also required to have a high working accuracy.

FIGS. 1A and 1B illustrate a composite magnetic head in the related art. As shown in FIG. 1A, the composite magnetic head has a magnetic resistance element 2 formed on a substrate 1 and a write element 5. As shown in FIG. 1B, the magnetic resistance element 2 is composed of a magnetic resistance film 3 and a pair of conductor films 4 connected to the opposite ends of the magnetic resistance film 3. The magnetic resistance element 2 is an element whose resistance changes according to an external magnetic field. Accordingly, by using the magnetic resistance element 2, an electric current having a magnitude corresponding to the magnetization of a track T on a magnetic disk, for example, can be output to thereby allow reading of data recorded on the magnetic disk.

The magnetic resistance element 2 is capable of reading data only. Therefore, the write element 5 is additionally provided to write data as required. The write element 5 is an inductive head, for example. The write element 5 has a lower magnetic pole 6 and an upper magnetic pole 8 opposed to the lower magnetic pole 6 with a gap defined therebetween. A coil 7 is provided between the lower magnetic pole 6 and the upper magnetic pole 8 to excite these magnetic poles 6 and 8. The coil 7 is surrounded by a nonmagnetic insulating layer 9.

In such a composite magnetic head, it is desirable to make constant the resistance of the magnetic resistance film 3 of the magnetic resistance element 2. However, it is difficult to make the resistance constant only in a manufacturing process for the thin film of the magnetic head. Accordingly, after forming the thin film of the magnetic head, it is machined so that the height (width) h of the magnetic resistance film 3 becomes constant, thus obtaining a constant resistance.

FIGS. 2A to 2C and 3A to 3D illustrate a manufacturing process for the composite magnetic head shown in FIGS. 1A and 1B.

As shown in FIG. 2A, a set of many row bars 11 each having a plurality of composite magnetic heads 12 are formed on a wafer 10 by a thin-film technique. In the next step, the wafer 10 is cut into many rectangular parts to thereby separate the above set into the row bars 11. As shown in FIG. 2B, each row bar 11 has a plurality of magnetic heads 12 and three resistance elements 12a for monitoring of lapping. These magnetic heads 12 and resistance elements 12a are arranged in a line. For example, the resistance elements 12a are positioned at the left end, center, and right end of the row bar 11.

Each row bar 11 having the plural magnetic heads 12 is next subjected to lapping, so that the height of the magnetic resistance film 3 in each head becomes constant as mentioned above. However, since the row bar 11 is as thin as 0.3 mm, for example, it is difficult to mount the row bar 11 directly on a lapping machine. Accordingly, as shown in FIG. 2C, the row bar 11 is temporarily bonded to a row tool 13 by means of a hot-melt wax.

In the next step, the row bar 11 bonded to the row tool 13 is lapped on a lap plate 14 as shown in FIG. 3A. In this lapping operation, the resistance of each resistance element 12a of the row bar 11 is measured all the times as known from U.S. Pat. No. 5,023,991 and Japanese Patent Laid-open No. Hei 5-123960, for example. Then, whether or not the height of the magnetic resistance film of each magnetic head 12 has become a target value is detected according to the measured resistance of each resistance element 12a.

At the time it is detected that the magnetic resistance film has been lapped up to the target height, according to the measured resistance, the lapping operation is stopped. Thereafter, as shown in FIG. 3B, a slider is formed on a lower surface 11-1 of the row bar 11.

In the next step, the row bar 11 is cut into the plural magnetic heads 12 in the condition that it is bonded to the row tool 13 as shown in FIG. 3C. In the next step, the row tool 13 is heated to melt the hot-melt wax, thereby removing the magnetic heads 12 from the row tool 13 to obtain the individual magnetic heads 12.

In this manner, the row bar 11 having the plural magnetic heads 12 arranged in a line is first prepared, and next subjected to lapping, so that the magnetic resistance films 3 of the plural magnetic heads 12 can be lapped at a time.

However, there are variations in height among the magnetic resistance films 3 of the plural magnetic heads 12 in the row bar 11 on the order of submicrons, depending on a mounting accuracy, film forming accuracy, etc. It is accordingly necessary to correct such variations in the lapping operation for mass production of magnetic heads uniform in characteristics.

In this respect, it is known in a related art that a hole is formed through the row tool 13 at a position near a work surface to which the row bar 11 is bonded, and that a force is applied from an actuator through this hole to the row tool 13, thereby producing a desired pressure distribution between the row bar 11 and a lapping surface of the lap plate 14. However, since the hole of the row tool 13 is singular, the variations cannot be reduced and it is difficult to obtain a high working accuracy.

To cope with this problem, it has been proposed to form a plurality of holes through the row tool 13 and apply forces from actuators through these holes, respectively to operate the row tool 13 as described in U.S. Pat. No. 5,607,340. However, these actuators are required to have capacities of applying relatively large forces to each one of these holes for obtaining a desired pressure distribution, it is therefore difficult to manufacture such actuators acting on a plurality of load points. As a result, the spacing between any adjacent ones of the plural load points (the plural holes) cannot be greatly reduced, yet causing a difficulty of improvement in working accuracy.

SUMMARY OF THE INVENTION

It is therefore an object of the present invention to provide a lapping machine, row tool, and lapping method suitable for improvement in working accuracy.

In accordance with a first aspect of the present invention, there is provided a lapping machine for lapping a row bar for obtaining a plurality of head sliders. The lapping machine comprises a lap plate for providing a lapping surface, a row tool having a work surface for pressing the row bar against the lapping surface, and a mechanism for operating the row tool so that a given pressure distribution is produced between the row bar and the lapping surface. The row tool has a plurality of holes arranged along the work surface. The mechanism includes a plurality of pivoted links each having a load point where a force having a direction perpendicular to the work surface is applied to the row tool in each of the holes. Each of the pivoted links further has a support point as the fulcrum and an effort point where a force having a direction substantially parallel to the work surface is received. The ratio of a first distance between the load point and the support point to a second distance between the effort point and the support point is substantially constant.

With this configuration, even in the case that the load points of the pivoted links are arranged in a line and the effort points of the pivoted links are zigzag arranged, the efficiency of propagation of the forces from the effort points to the respective load points can be maintained constant. Accordingly, the spacing between any adjacent ones of the load points can be easily reduced, and a desired pressure distribution can be produced between the row bar and the lapping surface. As a result, a working accuracy can be improved to thereby achieve the object of the present invention.

In accordance with a second aspect of the present invention, there is provided a row tool for use in lapping a row bar for obtaining a plurality of head sliders. The row tool has a work surface for pressing the row bar against a lapping surface, a plurality of holes arranged along the work surface, a plurality of first slits formed so as to respectively surround the holes having a substantially C-shaped configuration open to the work surface, and a plurality of second slits formed so that each of the second slits surrounds adjacent end portions of any adjacent two of the first slits and has a substantially C-shaped configuration open to the opposite side of the work surface.

In accordance with a third aspect of the present invention, there is provided a lapping machine for lapping a row bar for obtaining a plurality of head sliders. The lapping machine comprises a lap plate for providing a lapping surface, a row tool having a work surface for pressing the row bar against the lapping surface, and a mechanism for operating the row tool so that a given pressure distribution is produced between the row bar and the lapping surface. The row tool is identical with that in accordance with the second aspect of the present invention. The mechanism comprises a plurality of pivoted links each for applying a force having a direction perpendicular to the work surface to the row tool in each of the holes.

In accordance with a fourth aspect of the present invention, there is provided a lapping method for lapping a row bar formed with a plurality of head sliders, comprising the steps of applying a force to one end of a pivoted link in a direction parallel to a lap plate to press a row tool supporting the row bar at the other end of the pivoted link in a direction perpendicular to the lap plate; and relatively moving the lap plate and the row tool to lap the row bar.

In accordance with a fifth aspect of the present invention, there is provided a lapping method for lapping a row bar formed with a plurality of head sliders by pressing a row tool supporting the row bar against a lap plate, comprising the steps of applying a force having a direction perpendicular to the lap plate to the row tool in a plurality of holes formed in the row tool and arranged in parallel to the lap plate, each of the holes being surrounded by a slit formed in the row tool on the opposite side of the lap plate; and relatively moving the lap plate and the row tool to lap the row bar.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Some preferred embodiments of the present invention will now be described in detail with reference to the drawings.

Figure 1A:
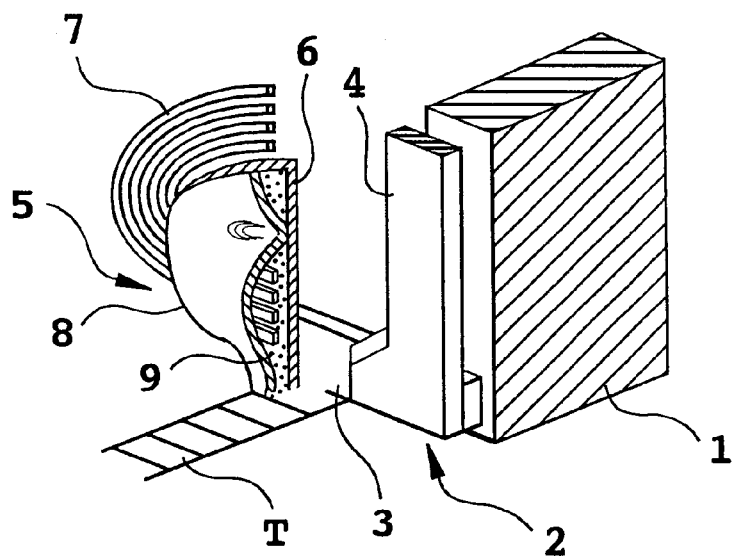
FIGS. 1A and 1B are a partially-cutaway perspective view and an elevational view of a composite magnetic head in the related art.
Figure 1B:
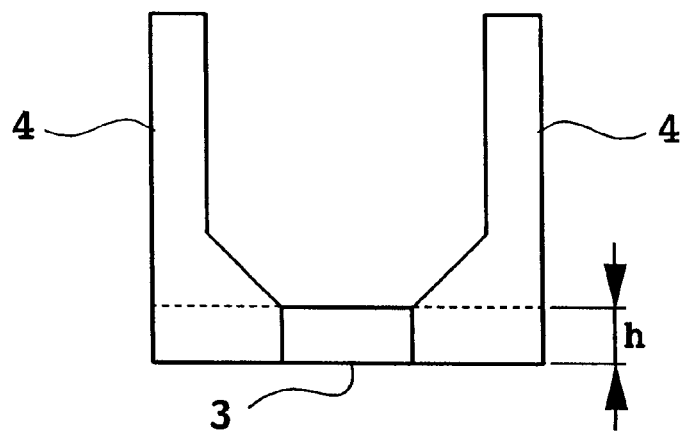
Figure 2A:
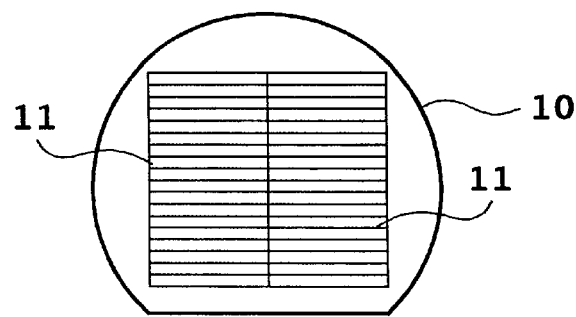
FIGS. 2A to 2C are illustrations of a manufacturing process for the composite magnetic head shown in FIGS. 1A and 1B (Part I)
Figure 2B:
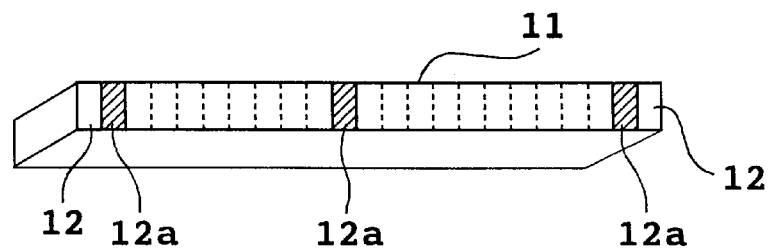
Figure 2C:
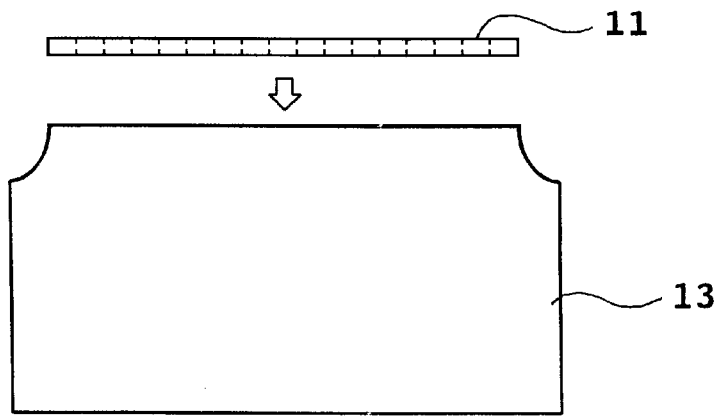
Figure 3A:
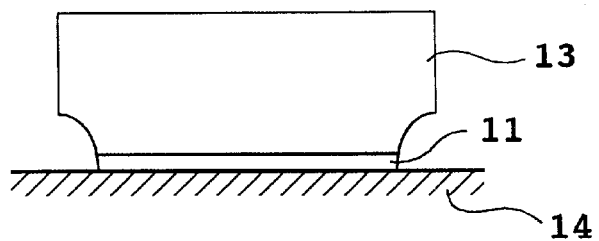
FIGS. 3A to 3D are illustrations of a manufacturing process for the composite magnetic head shown in FIGS. 1A and 1B (Part II)
Figure 3B:
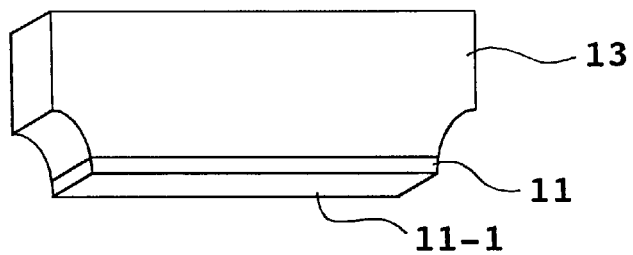
Figure 3C:
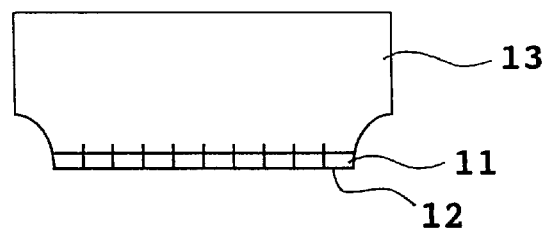
Figure 3D:
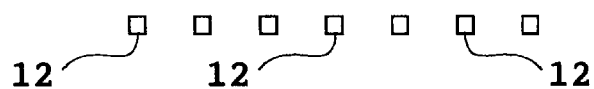
Figure 4:
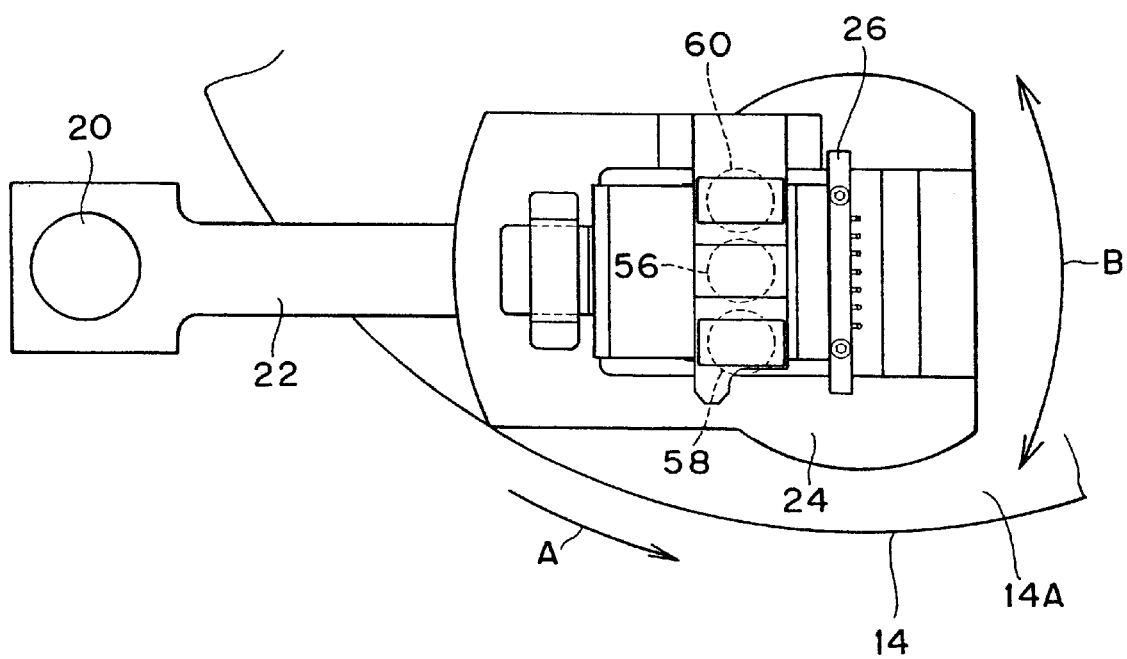
FIG. 4 is a plan view of a lapping machine to which the present invention is applied.
Figure 5:
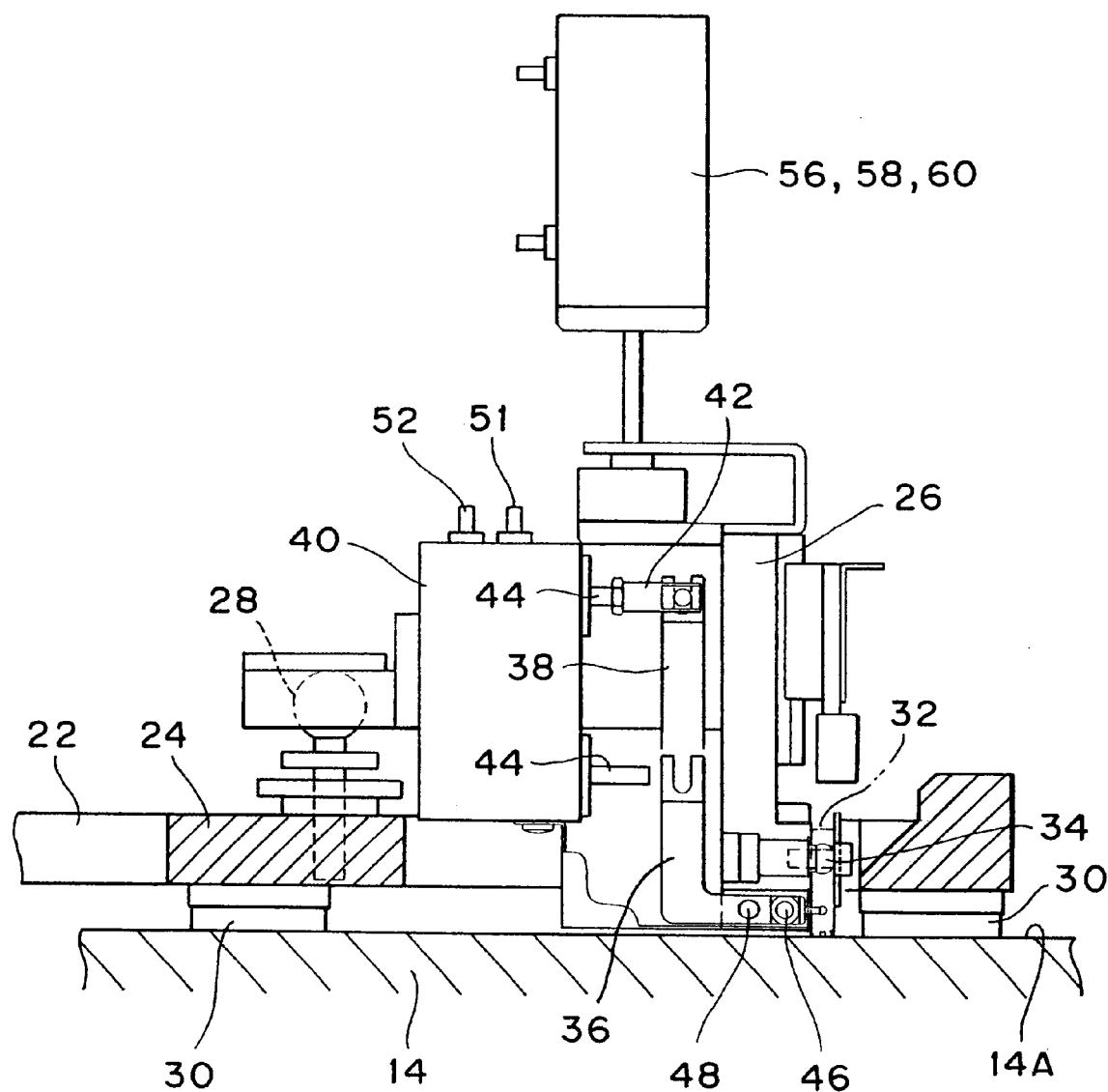
FIG. 5 is a partially-cutaway side view of the lapping machine shown in FIG. 4.
Figure 6:
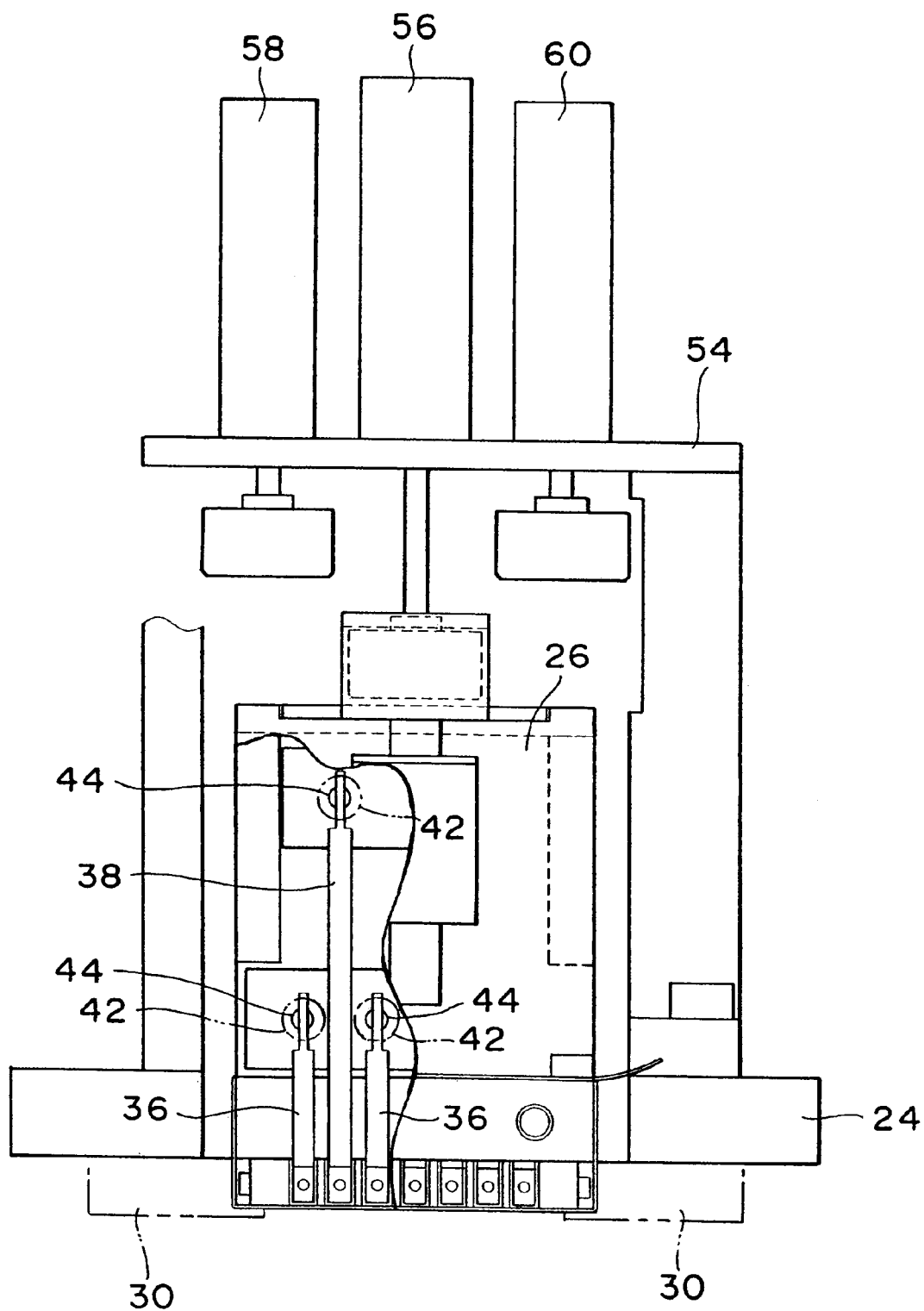
FIG. 6 is a partially-cutaway elevational view of the lapping machine shown in FIG. 4.

FIGS. 4, 5, and 6 are a plan view, partially-cutaway side view, and partially-cutaway elevational view showing a preferred embodiment of the lapping machine according to the present invention, respectively.

As shown in FIG. 4, a lap plate 14 for providing a lapping surface 14A is rotated in a direction of arrow A by a motor (not shown). A lap base 24 is pivotably supported through an arm 22 to a pivot shaft 20 fixed to the lapping machine, so that the lap base 24 is pivotally moved about the pivot shaft 20 in a direction of arrow B by a drive mechanism (not shown) upon lapping.

As shown in FIG. 5, an adapter 26 is supported at one point by a ball 28 fixed to the lap base 24. A plurality of (e.g., four in this preferred embodiment) feet 30 are provided on the lower surface of the lap base 24. The feet 30 slide on the lapping surface 14A. A row tool 32 is mounted at a lower portion of the adapter 26.

Figure 7:
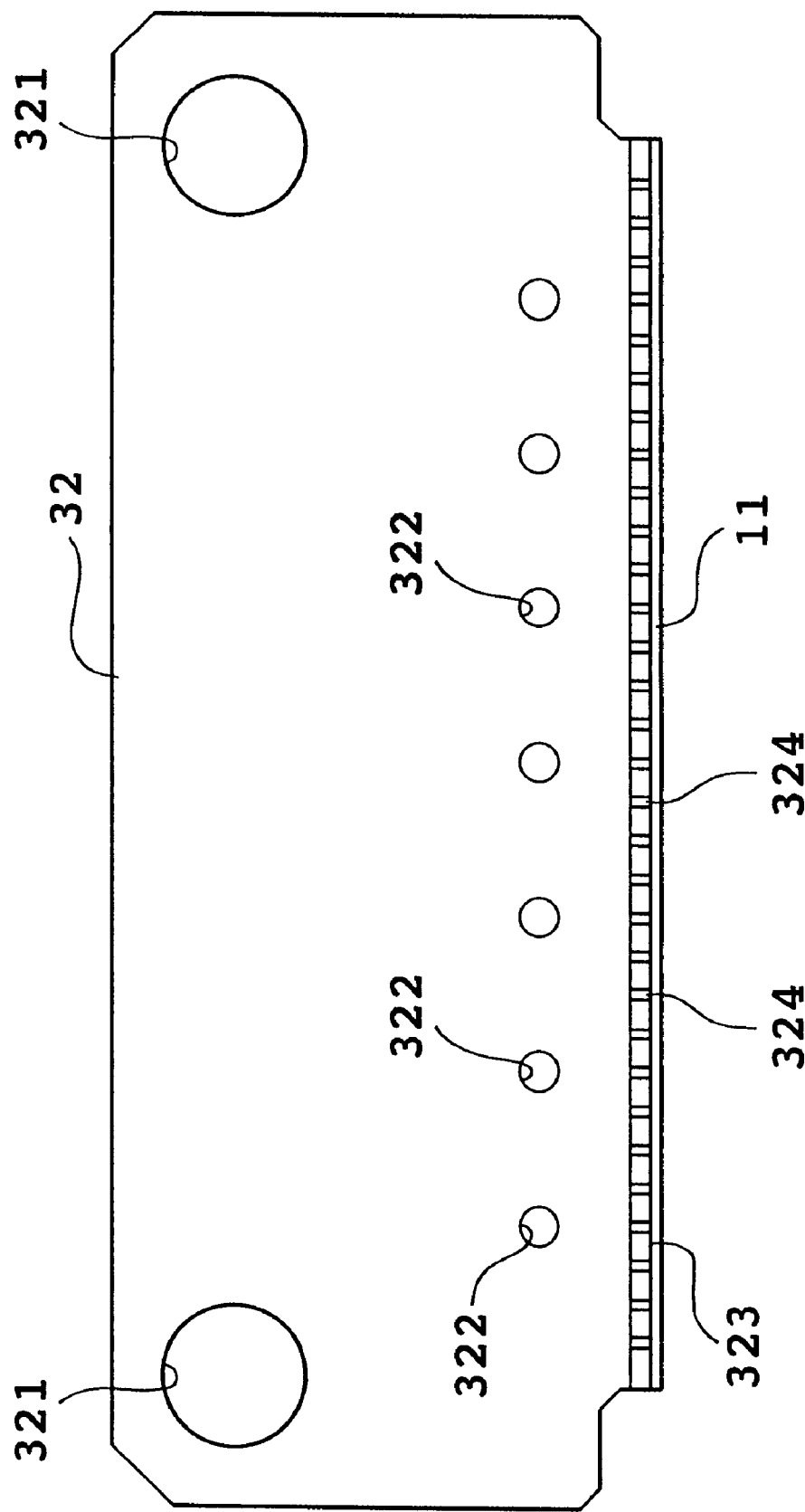
FIG. 7 is an elevational view of a row tool applicable to the present invention.

Referring to FIG. 7 showing the row tool 32 in elevation, the row tool 32 has a pair of holes 321 formed to mount the row tool 32 to the adapter 26, a plurality of (e.g., seven in this preferred embodiment) holes 322 formed to effect elastic deformation of the row tool 32 by means of a mechanism to be hereinafter described, and a work surface 323 to be bonded to a row bar 11 by means of a hot-melt wax, for example. The work surface 323 is formed with a plurality of grooves 324 for use in dicing the row bar 11. The holes 322 are arranged at equal intervals along the work surface 323.

Referring back to FIG. 5, a pair of projections 34 provided on the adapter 26 are inserted through the holes 321 of the row tool 32, thereby mounting the row tool 32 on the adapter 26. The row bar 11 is pressed against the lapping surface 14A by the work surface 323 of the row tool 32, because the adapter 26 is supported at one point by the ball 28. To produce a given pressure distribution between the row bar 11 and the lapping surface 14A, this preferred embodiment employs four short links 36, three long links 38, and an air cylinder 40. Each of the links 36 and 38 is connected through a connector 42 to a cylinder rod 44 of the air cylinder 40.

Figure 8:
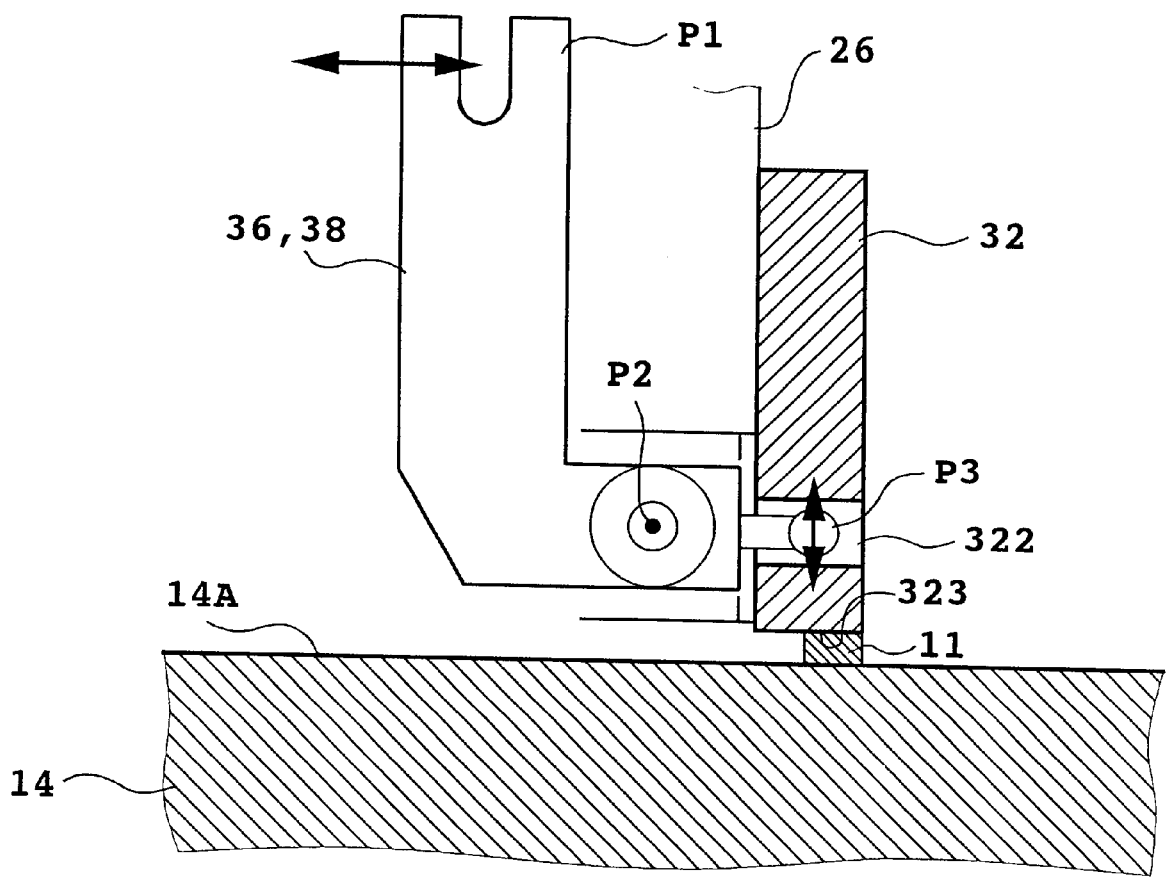
FIG. 8 is a schematic sectional side view for illustrating the operation of long links and short links shown in FIG. 5.

FIG. 8 is a schematic sectional side view for illustrating the operation of the short links 36 and the long links 38. Each of the short links 36 and the long links 38 has an effort point P1 where a force is received in a direction substantially parallel to the work surface 323 from the corresponding cylinder rod 44, a support point P2 as the fulcrum or the center of pivotal movement of each link, and a load point P3 where a force is applied to the row tool 32 inside the corresponding hole 322 in a direction substantially perpendicular to the work surface 323. For example, when the cylinder rod 44 is pushed to displace the effort point P1 rightward as shown in FIG. 8, the load point P3 is displaced downward as shown in FIG. 8, thereby increasing the force pressing the row bar 11 against the lapping surface 14A. Conversely, when the cylinder rod 44 is drawn to displace the effort point P1 leftward as shown in FIG. 8, the load point P3 is displaced upward as shown in FIG. 8, thereby decreasing the force pressing the row bar 11 against the lapping surface 14A.

Figure 9:
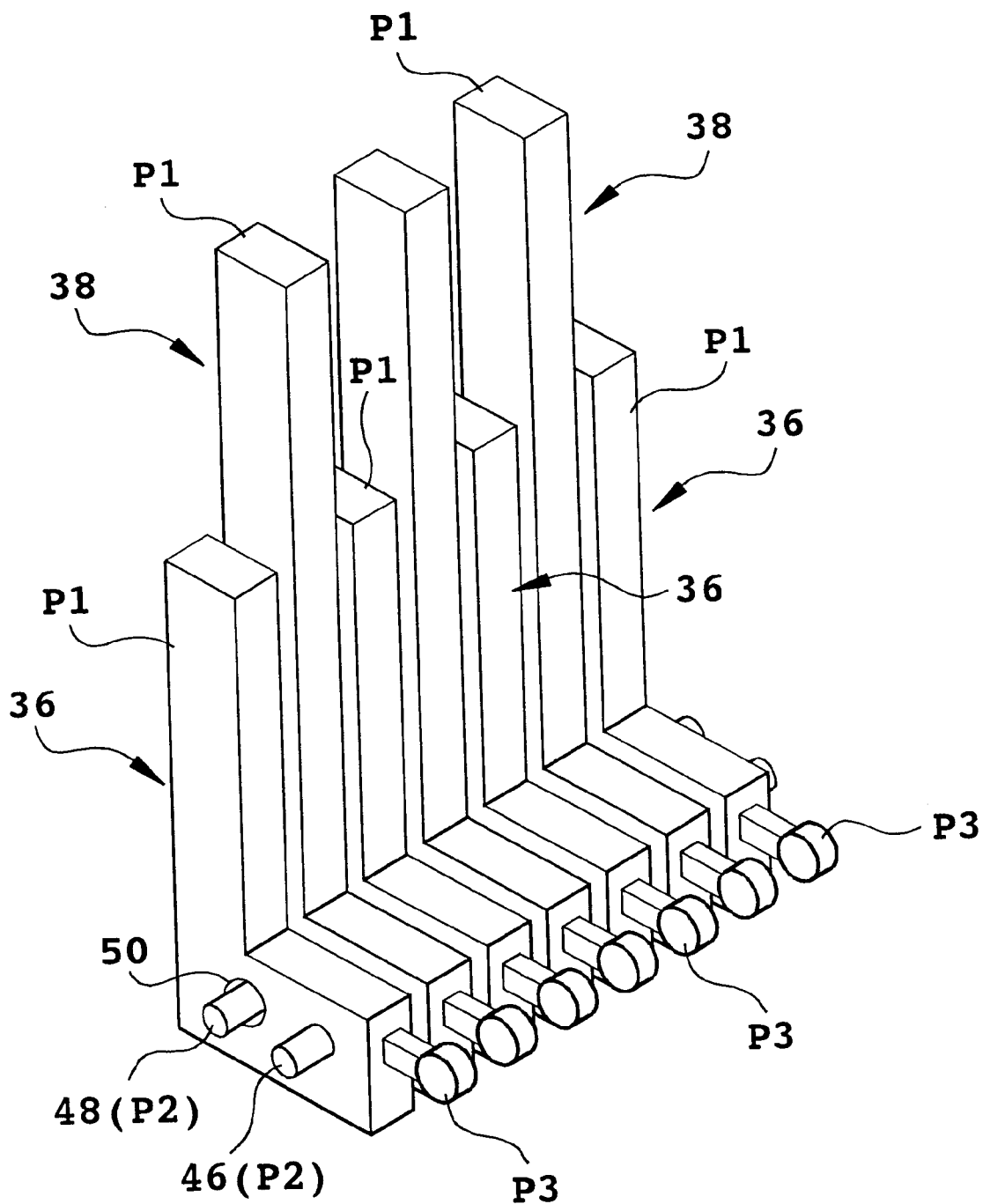
FIG. 9 is a perspective view of the long links and the short links shown in FIG. 5.

Referring to FIG. 9, the short links 36 and the long links 38 are alternately arranged. The support point P2 of each short link 36 is provided by a shaft 46 for pivotally supporting each short link 36. The support point P2 of each long link 38 is provided by a shaft 48 for pivotably supporting each long link 38. The distance between the support point P2 and the load point P3 of each short link 36 is shorter than the distance between the support point P2 and the load point P3 of each long link 38. Accordingly, the shaft 46 is positioned between the shaft 48 and the load point P3. Each short link 36 has a hole 50 through which the shaft 48 is loosely inserted so that the pivotal movement of this short link 36 is allowed. Similarly, each long link 38 has a hole (not shown) through which the shaft 46 is loosely inserted so that the pivotal movement of this long link 38 is allowed. The shafts 46 and 48 are fixed to the adapter 26.

Figure 10A:
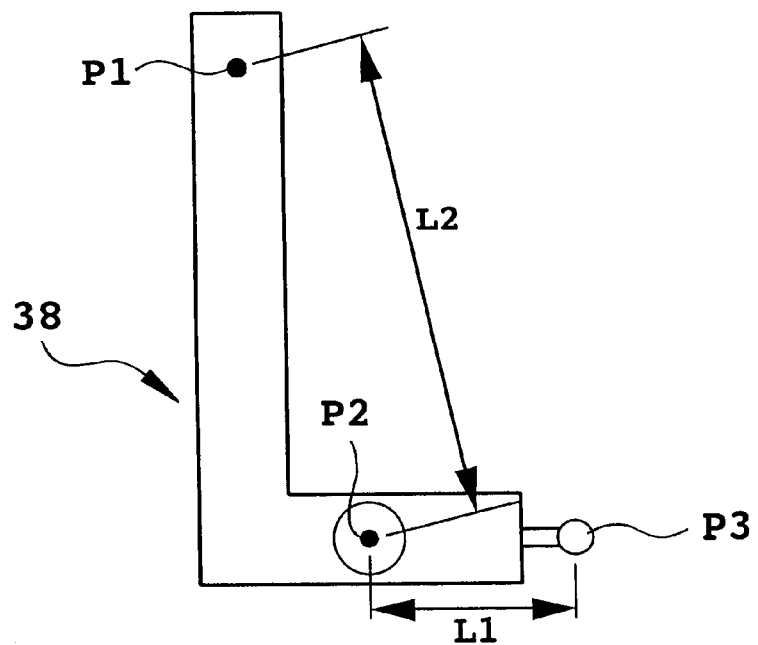
FIGS. 10A and 10B are schematic side views showing an example of the design of each long link and each short link shown in FIG. 5.
Figure 10B:
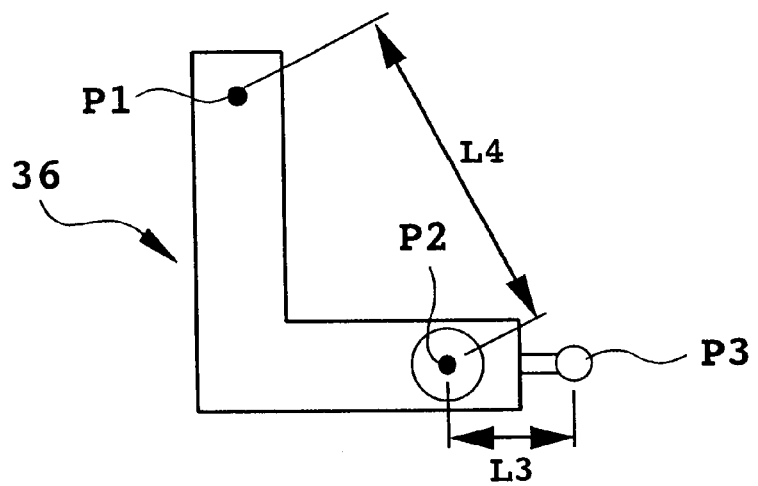

FIGS. 10A and 10B are schematic side views showing an example of the design of each long link 38 and each short link 36, respectively. As shown in FIG. 10A, the distance between the support point P2 and the load point P3 in each long link 38 is set to L1, and the distance between the support point P2 and the effort point P1 in each long link 38 is set to L2. As shown in FIG. 10B, the distance between the support point P2 and the load point P3 in each short link 36 is set to L3 (L3 , L1), and the distance between the support point P2 and the effort point P1 in each short link 36 is set to L4 (L4 , L2).

In accordance with the first aspect of the present invention, the relation of L2/L1=L4/L3 is satisfied.

Figure 11:
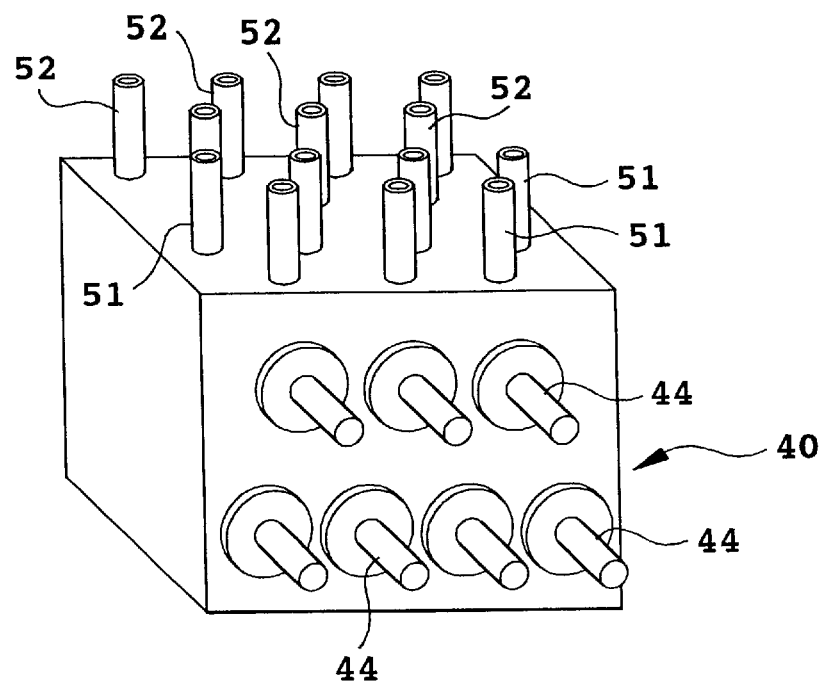
FIG. 11 is a perspective view of an air cylinder shown in FIG. 5.

In the combination of the short links 36 and the long links 38 as shown in FIG. 9, a straight line formed by connecting the four effort points P1 of the short links 36 is different in position from a straight line formed by connecting the three effort points P1 of the long links 38. Accordingly, the air cylinder 40 can be configured as shown in FIG. 11 in such a manner that the seven cylinder rods 44 are zigzag arranged. Each cylinder rod 44 is controlled by a pair of air tubes 51 and 52. In the case that the air tube 51 is connected to a positive pressure source and the air tube 52 is connected to a negative pressure source, the corresponding cylinder rod 44 is drawn into the air cylinder 40. Conversely, in the case that the air tube 51 is connected to a negative pressure source and the air tube 52 is connected to a positive pressure source, the corresponding cylinder rod 44 is pushed out of the air cylinder 40.

Since the above-mentioned relation L2/L1=L4/L3 is satisfied in accordance with the first aspect of the present invention, the forces required at the effort points P1 of each short link 36 and each long link 38 can be made equal, so as to produce the forces of the same magnitude at the load points P3 of each short link 36 and each long link 38. Further, by zigzag arranging the cylinder rods 44 as shown in FIG. 11, the spacing between each short link 36 and each long link 38 adjacent thereto can be reduced while ensuring a sufficiently large force to be given by each cylinder rod 44, thereby improving a working accuracy.

Referring again to FIG. 6, a pressure cylinder 56 and a pair of balance cylinders 58 and 60 are provided on a table 54 fixed to the lap base 24. The pressure cylinder 56 functions to press the upper surface of the adapter 26 at its substantially central portion, so as to apply a uniform pressure to the row tool 32. The use of the pressure cylinder 56 provides an advantage such that it is sufficient for the air cylinder 40 to have a capacity enough to produce a deviation in a required pressure distribution. Accordingly, the capacity of the air cylinder 40 can be reduced.

The balance cylinders 58 and 60 function to press the upper surface of the adapter 26 at its left and right end portions, respectively, as shown in FIG. 6, so as to correct the imbalance of the pressure applied to the row tool 32 in its longitudinal direction. The use of the balance cylinders 58 and 60 also provides an advantage similar to that provided by using the pressure cylinder 56, so that the capacity of the air cylinder 40 can be reduced.

Figure 12:
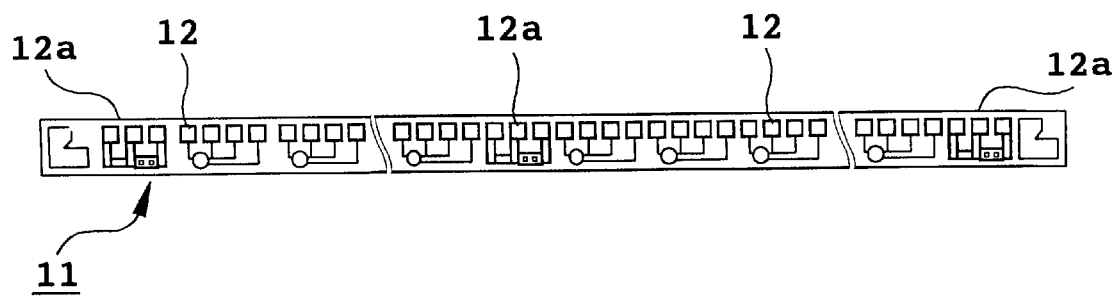
FIG. 12 is an elevational view of a row bar applicable to the present invention.

As shown in FIG. 12, the row bar 11 has a plurality of magnetic heads 12 and a plurality of resistance elements (ELG elements where ELG is an abbreviation of Electrical Lapping Guide) 12a formed to monitor a lapping operation. In this preferred embodiment, the ELG elements 12a are provided at three positions, or at the left end, the center, and the right end of the row bar 11.

Figure 13:
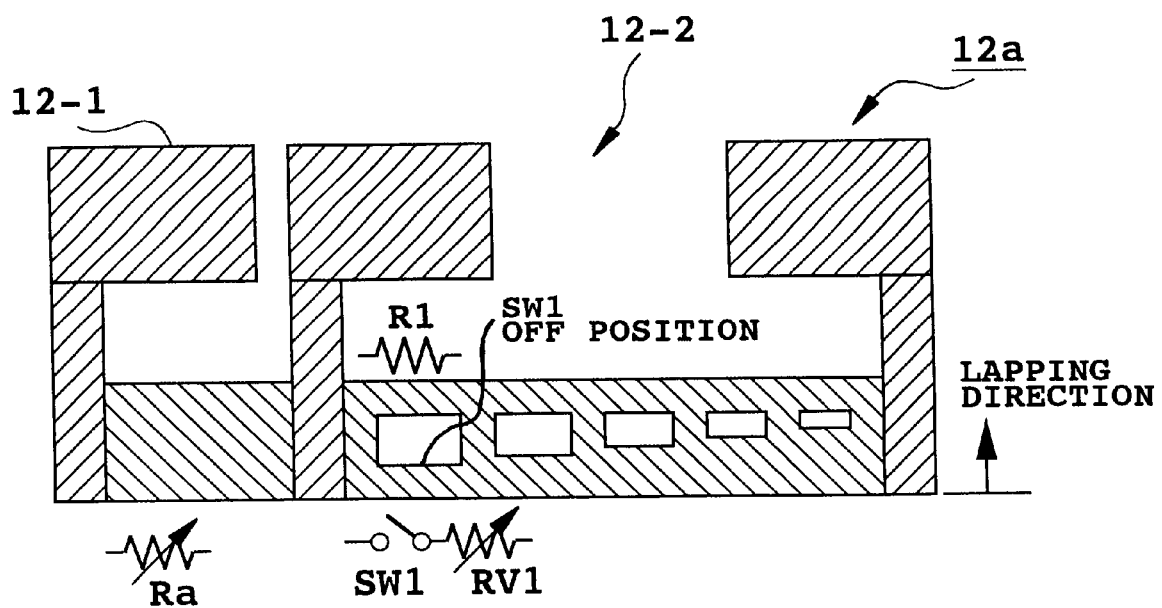
FIG. 13 is an enlarged view of each ELG element shown in FIG. 12.

As shown in FIG. 13, each ELG element 12a is composed of an analog resistor 12-1 and a digital resistor 12-2. The analog resistor 12-1 has a pattern such that the resistance increases with a decrease in height of the resistance film. The digital resistor 12-2 has a pattern such that it goes off when the height of the resistance film decreases to a given value.

Figure 14A:
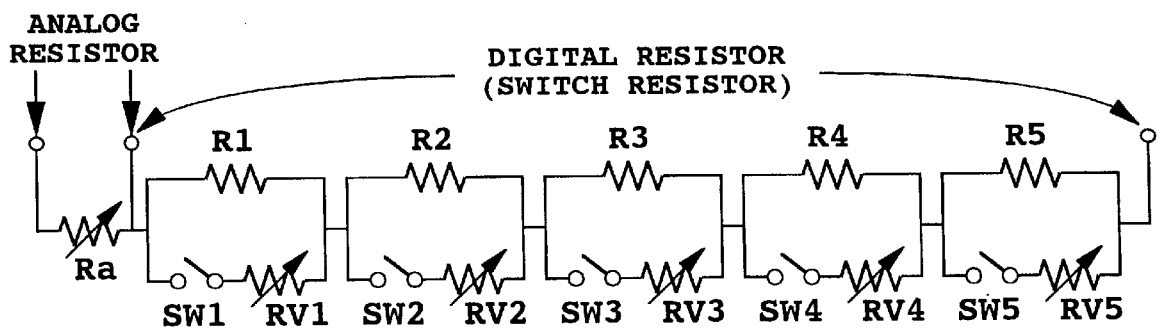
FIG. 14A is a circuit diagram of the ELG element shown in FIG. 13.
Figure 14B:
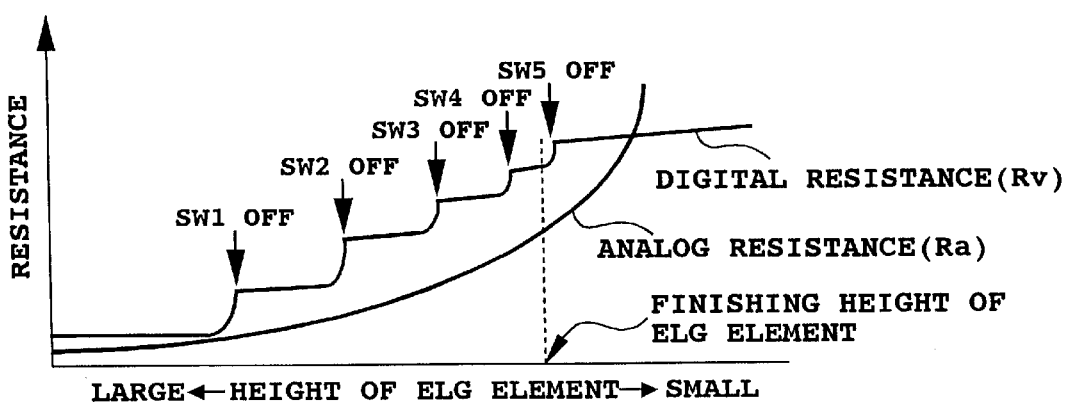
FIG. 14B is a graph showing the relation between resistance and height of the ELG element shown in FIG. 13.

Accordingly, the ELG element 12a can be shown as an equivalent circuit in FIG. 14A, in which the analog resistor 12-1 is shown as a variable resistor. As shown in FIG. 14B, the resistance of the analog resistor 12-1 increases with a decrease in height of the ELG element 12a. Further, as shown in FIG. 14A, the equivalent circuit of the digital resistor 12-2 is shown as five switch resistors. As shown in FIG. 14B, the resistance of the digital resistor 12-2 stepwise changes at an off position thereof.

The resistance of the ELG element 12a corresponds to the height of the ELG element 12a. The relation between the resistance Ra of the analog resistor 12-1 and the height h of the ELG element 12a is approximated by the following equation.

$$Ra = a/h + b$$

where a and b stand for the coefficients that can be preliminarily obtained by experiment. However, this characteristic changes according to process conditions or the like for each wafer. The digital resistor 12-2 is provided to compensate for this change. The off positions h1 to h5 of the digital resistor 12-2 are predetermined. Accordingly, by detecting an off position of the digital resistor 12-2, a measured resistance thereof is obtained. Then, the measured resistance and the off position corresponding thereto are inserted into the above equation. In actual, by detecting two off positions of the digital resistor 12-2, the coefficients a and b in the above equation can be obtained.

By using this equation with the coefficients a and b defined, the analog resistance Ra is converted into the height h of the ELG element 12a. In this manner, by measuring the resistance of the ELG element 12a, the height of the ELG element 12a can be obtained. Accordingly, whether or not the height of the ELG element 12a has reached a target value can be determined. At the time the height of the ELG element 12a has reached the target value, the lapping operation is stopped.

While the row bar 11 has the three ELG elements 12a as shown in FIG. 12, it is preferable to use a larger number of (e.g., 31) ELG elements 12a in order to independently control the seven links 36 and 38 as practiced in this preferred embodiment. Upon lapping, the pressure distribution to be produced between the row bar 11 and the lapping surface 14A is set so that the resistances of all the ELG elements 12a become uniform. Such setting of the pressure distribution may be made by feedback control each of the links 36 and 38 according to the measured resistance of each ELG element 12a. Alternatively, an operating amount of each of the links 36 and 38 may be obtained by calculation from the resistance of each ELG element 12a to set the pressure distribution between the row bar 11 and the lapping surface 14A by feedforward control. Further, the control of pressures to be applied to the pressure cylinder 56 and the balance cylinders 58 abd 56 may be made by feedback control or feedforward control according to the measured resistance of each ELG element 12a.

The row tool 32 shown in FIG. 7 is formed of metal in general. Accordingly, there is a possibility that a large force may be required to obtain a unit amount of deformation of the work surface 323 because only the holes 322 for deformation of the work surface 323 are used. Furthermore, when a force is applied to one of the holes 322, the deformation of the work surface 323 due to this force may fall over a wide range, causing a difficulty of independent control of the deformation by each hole 322. Another preferred embodiment of the row tool improved in this point of view will now be described.

Figure 15:
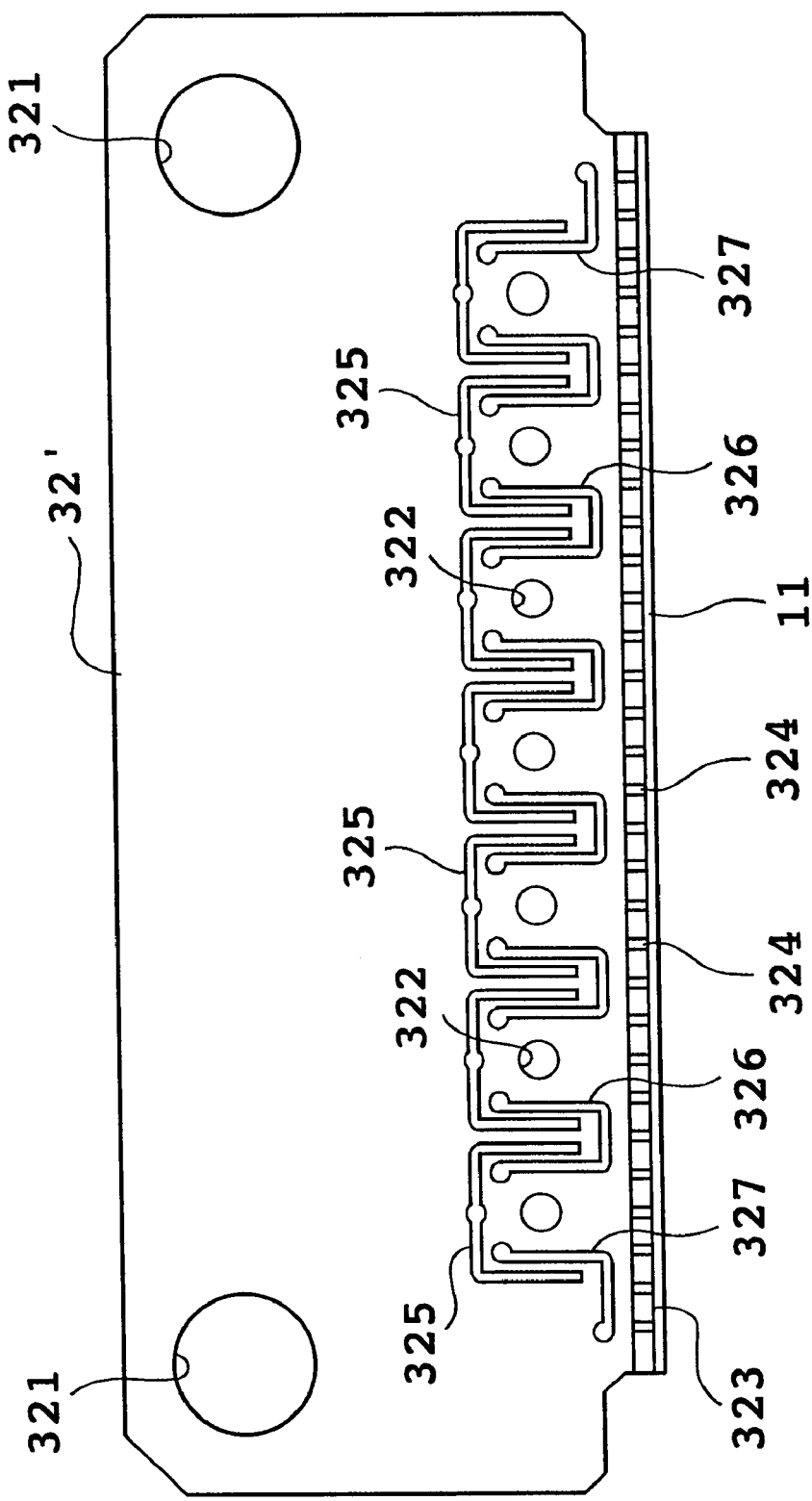
FIG. 15 is an elevational view of another row tool applicable to the present invention.

FIG. 15 is an elevational view of a row tool 32' applicable to the present invention. In contrast to the row tool 32 shown in FIG. 7, the row tool 32' is characterized in that it further has a plurality of (e.g., seven as shown) first slits 325 and a plurality of (e.g., six as shown) second slits 326. The first slits 325 are formed so as to respectively surround the holes 322 having a substantially C-shaped configuration open to the work surface 323. Each of the second slits 326 is formed so as to surround adjacent end portions of any adjacent two of the first slits 325 having a substantially C-shaped configuration open to the opposite side of the work surface 323. In addition, a pair of third slits 327 each having an L-shaped configuration are formed in the vicinity of the two opposite end holes 322, so as to make the property of these two opposite end holes 322 similar to that of the other intermediate holes 322.

Each slit may be formed by wire discharge machining, for example. In FIG. 15, an expanded portion formed at each end or at the middle of each slit corresponds to a small hole preliminarily formed to perform initialization of this kind of wire discharge machining.

Figure 16A:
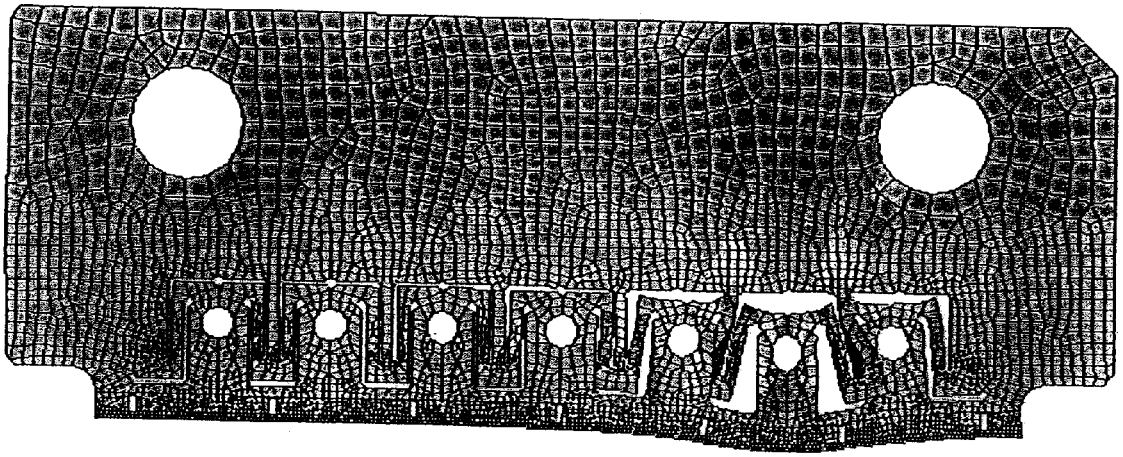
FIGS. 16A and 16B are views showing analytic models of deformation of the row tool shown in FIG. 15.
Figure 16B:
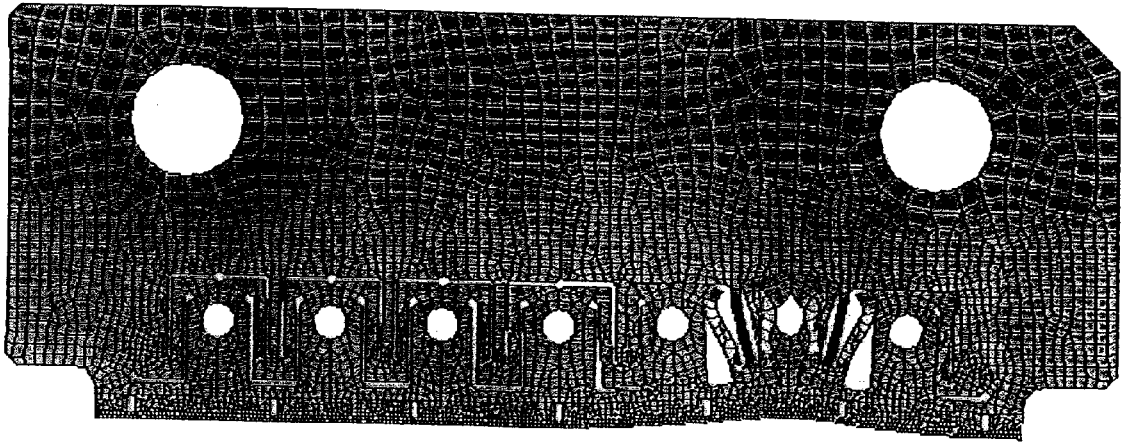

FIGS. 16A and 16B are views showing analytic models of deformation of the row tool 32' shown in FIG. 15 by a finite element method. More specifically, FIG. 16A shows an analytic model of deformation in the case that a downward load is applied to the hole 322 next to the right end hole 322, and FIG. 16B shows an analytic model of deformation in the case that an upward load is applied to the same hole 322.

In accordance with the second aspect of the present invention, the first and second slits 325 and 326 are formed in the row tool 32'. As apparent from FIGS. 16A and 16B, a required load to be applied to each hole 322 for obtaining a unit amount of deformation of the work surface 323 can be sufficiently reduced over the row tool 32 shown in FIG. 7. Moreover, in the case that a load is applied to any one of the holes 322, the deformation of the work surface 323 can be prevented from falling over a wide range. Accordingly, the row tool 32' is suitable for fine setting of the pressure distribution between the row bar 11 and the lapping surface 14A, thus improving a working accuracy.

Figure 17:
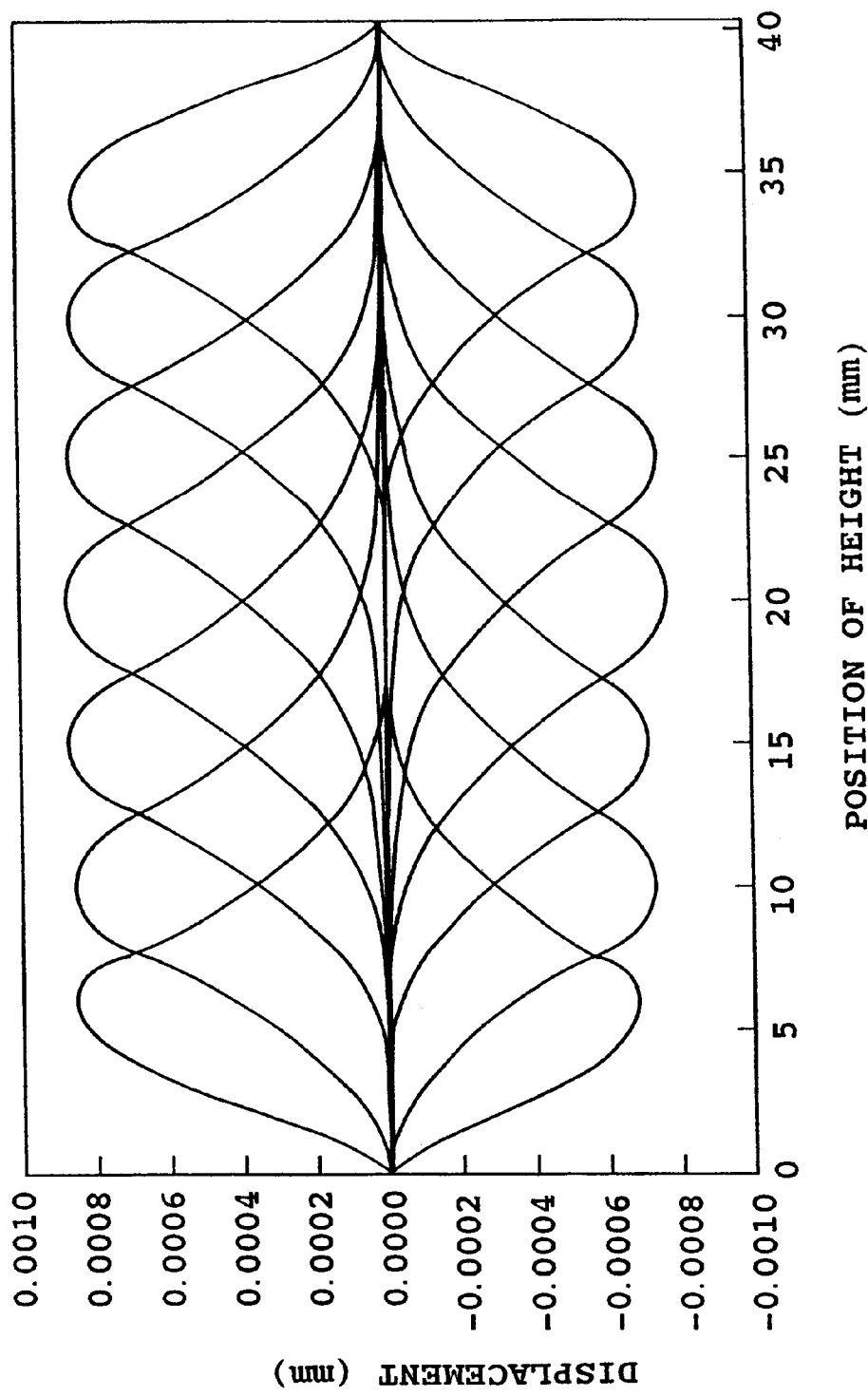
FIG. 17 is a graph showing the relation between the displacement of a work surface and the position on the work surface in the case that a unit load is applied to each hole of the row tool shown in FIG. 15.

FIG. 17 is a graph showing the relation between the displacement of the work surface 323 and the position on the work surface 323 in the case that a unit load is applied to each hole 322 of the row tool 32' shown in FIG.

More specifically, FIG. 17 shows the displacement of the work surface 323 in the case that a load of 1 kg is applied to each of the seven holes 322 in the upward direction and the downward direction. As apparent from FIG. 17, the formation of the slits 325 and 326 can provide characteristics that the deformations of the work surface 323 at the same position in the upward direction and the downward direction are symmetrical and that the range of the deformation of the work surface 323 in the case of applying a load to any one of the holes 322 is narrow. Owing to the former characteristic, the control based on the measured resistance of each ELG element 12a can be easily performed, and owing to the latter characteristic, independent control for each hole 322 can be performed.

Figure 18:
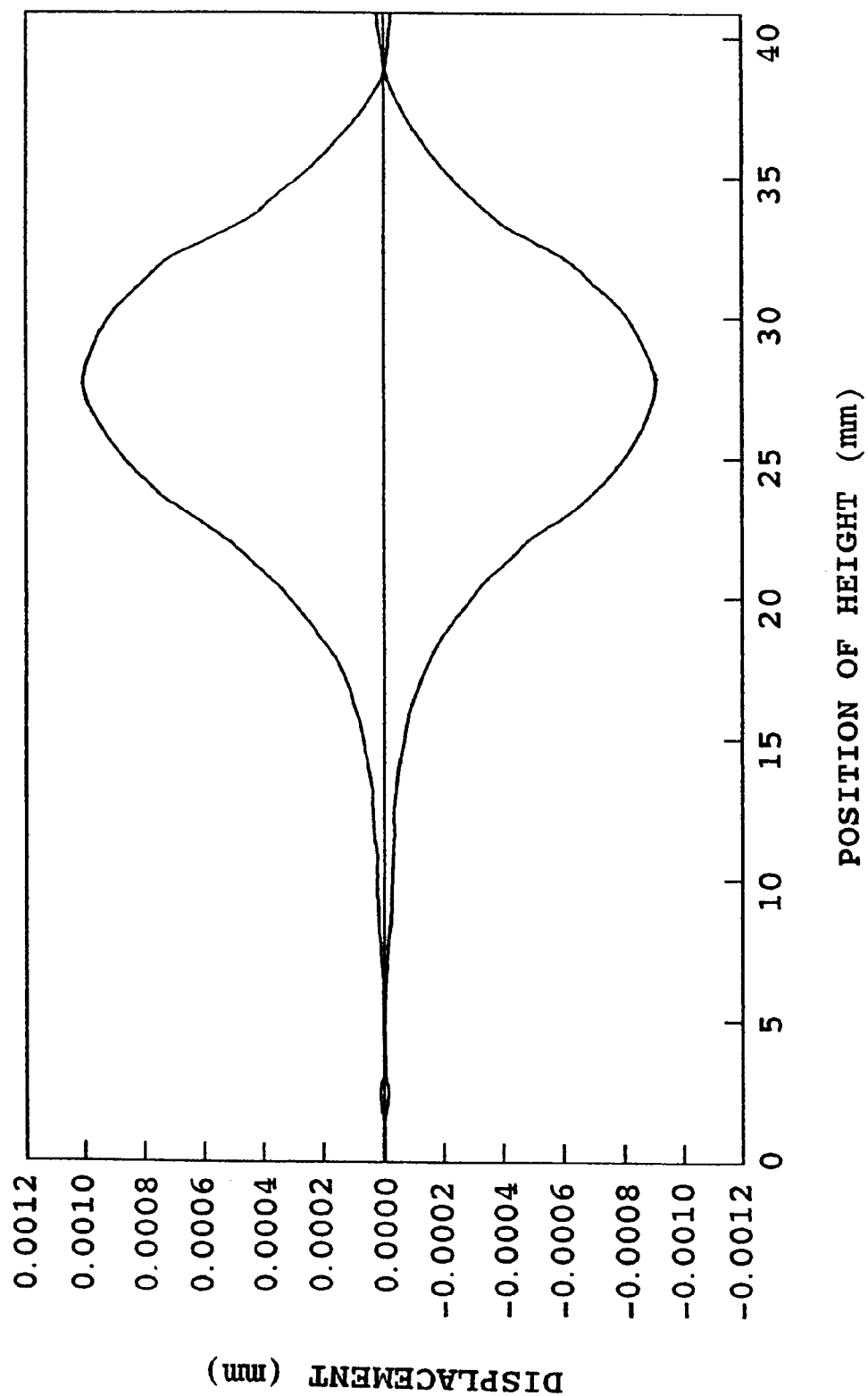
FIG. 18 is a graph showing the relation between the displacement of the work surface and the position on the work surface in the case that a unit load is applied to any two adjacent holes of the row tool shown in FIG. 15 in the same direction.

FIG. 18 is a graph showing the relation between the displacement of the work surface 323 and the position on the work surface 323 in the case that a unit load is applied to any two adjacent ones of the holes 322 of the row tool 32' shown in FIG. 15 in the same direction. More specifically, FIG. 18 shows the relation between the displacement of the work surface 323 and the position on the work surface 323 in the case that a load of 1 kg is applied to the second and third holes 322 counted from the right end hole 322 in the upward direction and the downward direction.

As in the row tool 32 having no slits shown in FIG. 7, there is a possibility that each curve corresponding to that shown in FIG. 18 may have two peaks when applying a load to any two adjacent ones of the holes 322 in the same direction. In this case, the control based on the measured resistance of each ELG element 12a may become difficult. To the contrary, in the row tool 32' having the slits 325 and 326 shown in FIG. 15, each curve has one peak as shown in FIG. 18, thereby eliminating the possible uncontrollability as in the row tool 32. This effect can be similarly exhibited also in the case of applying a load to more than two adjacent ones of the holes 322, thereby allowing fine setting of the pressure distribution between the row bar 11 and the lapping surface 14A.

Figure 19:
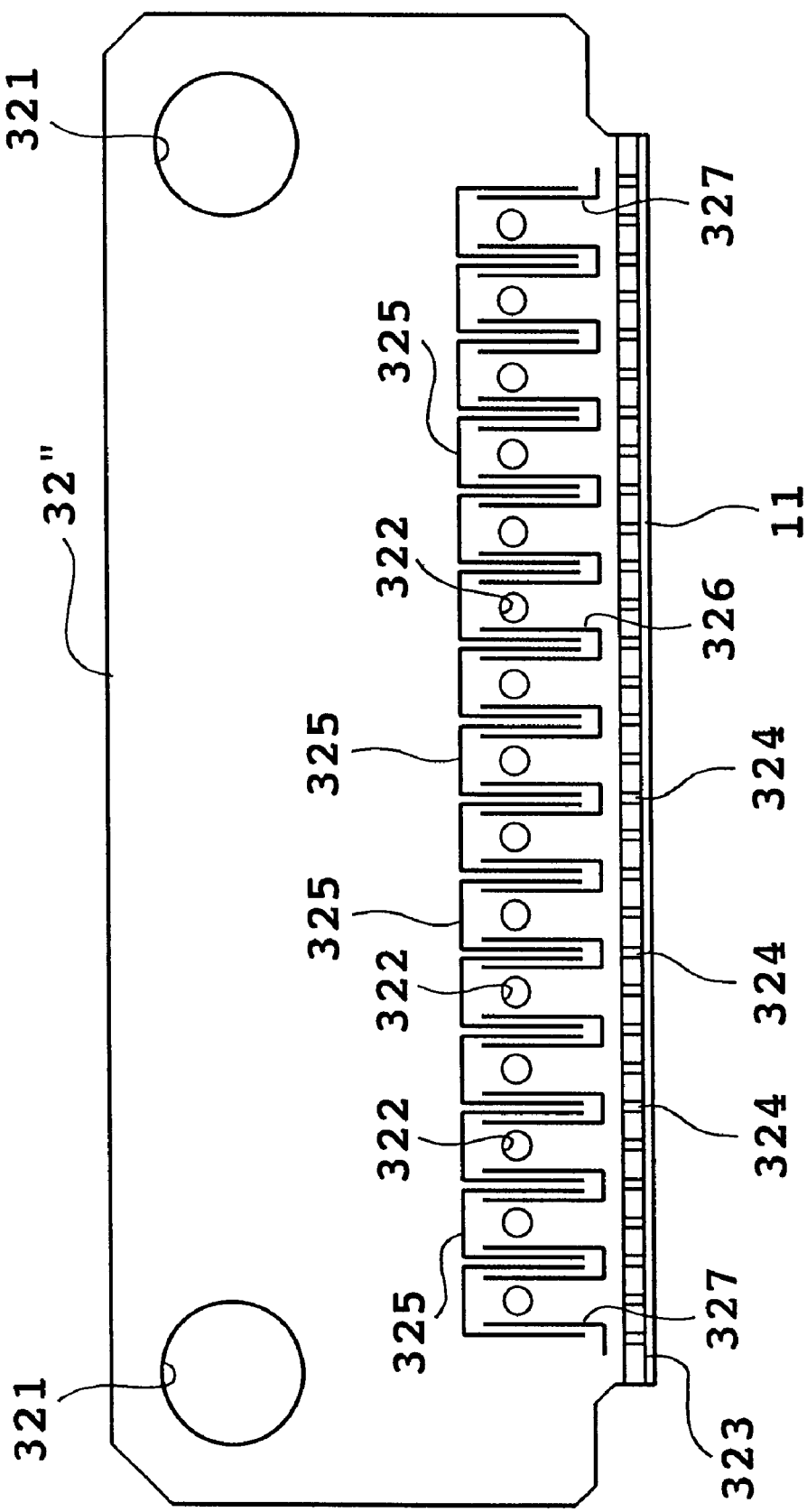
FIG. 19 is an elevational view of still another row tool applicable to the present invention.

FIG. 19 is an elevational view of another row tool 32" applicable to the present invention. In contrast to the row tool 32' shown in FIG. 15, the row tool 32" is characterized in that an increased number of holes 322 and slits 325 and 326 are formed. More specifically, fifteen holes 322, fifteen first slits 325, and fourteen second slits 326 are formed in the row tool 32". In the case that such many holes 322 are formed, the spacing between any two adjacent ones of the holes 322 is as small as several millimeters, for example. Accordingly, by combining the row tool 32" with the mechanism as shown in FIG. 9 in accordance with the first aspect of the present invention to provide a lapping machine, the working accuracy can be greatly improved.

While the actuator for operating the row tool includes an air cylinder in the above preferred embodiment, the present invention may adopt any other actuator including a solenoid or a piezoelectric element as driving means.

According to the present invention as described above, it is possible to provide a lapping machine, row tool, and lapping method suitable for improvement in working accuracy. The effects obtained by the specific preferred embodiments of the present invention have been described above, so the description thereof will be omitted herein.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A lapping machine for lapping a row bar for obtaining a plurality of head sliders, comprising:
   a lap plate for providing a lapping surface;
   a row tool having a work surface for pressing said row bar against said lapping surface; and
   a mechanism for operating said row tool so that a given pressure distribution is produced between said row bar and said lapping surface;
   said row tool having a plurality of holes arranged along said work surface;
   said mechanism including a plurality of pivoted links each having a load point where a force having a direction perpendicular to said work surface is applied to said row tool in each of said holes;
   each of said pivoted links further having a support point as the fulcrum and an effort point where a force having a direction substantially parallel to said work surface is received;
   the ratio of a first distance between said load point and said support point to a second distance between said effort point and said support point being substantially constant.

2. A lapping machine according to claim 1, wherein:
   said pivoted links comprise a plurality of first links and a plurality of second links alternately arranged;
   said first distance in each of said first links is longer than said first distance in each of said second links;
   said support point of each of said first links is provided by a first shaft for pivotably supporting said first links;
   said support point of each of said second links is provided by a second shaft for pivotably supporting said second links, said second shaft being positioned between said first shaft and said load point;
   each of said first links has a hole through which said second shaft is loosely inserted; and
   each of said second links has a hole through which said first shaft is loosely inserted.

3. A lapping machine according to claim 1, wherein said row tool further has a plurality of first slits formed so as to respectively surround said holes having a substantially C-shaped configuration open to said work surface, and a plurality of second slits formed so that each of said second slits surrounds adjacent end portions of any adjacent two of said first slits and has a substantially C-shaped configuration open to an opposite side of said work surface.

4. A row tool for use in lapping a row bar for obtaining a plurality of head sliders, said row tool having:
   a work surface for pressing said row bar against a lapping surface;
   a plurality of holes arranged along said work surface;
   a plurality of first slits formed so as to respectively surround said holes having a substantially C-shaped configuration open to said work surface;
   a plurality of second slits formed so that each of said second slits surrounds adjacent end portions of any adjacent two of said first slits and has a substantially C-shaped configuration open to the opposite side of said work surface.

5. A lapping machine for lapping a row bar for obtaining a plurality of head sliders, comprising:
   a lap plate for providing a lapping surface;
   a row tool having a work surface for pressing said row bar against said lapping surface; and
   a mechanism for operating said row tool so that a given pressure distribution is produced between said row bar and said lapping surface;
   said row tool having:

a plurality of holes arranged along said work surface;

a plurality of first slits formed so as to respectively surround said holes having a substantially C-shaped configuration open to said work surface; and a plurality of second slits formed so that each of said second slits surrounds adjacent end portions of any adjacent two of said first slits and has a substantially C-shaped configuration open to the opposite side of said work surface;

said mechanism comprising a plurality of pivoted links each for applying a force having a direction perpendicular to said work surface to said row tool in each of said holes.

6. A lapping machine according to claim 5, wherein:

each of said pivoted links has a load point coming into contact with said row tool in each of said holes, a support point as the fulcrum, and an effort point where a force having a direction parallel to said work surface is received;

the ratio of a first distance between said load point and said support point to a second distance between said effort point and said support point being substantially constant.

7. A lapping machine according to claim 6, wherein:

said pivoted links comprise a plurality of first links and a plurality of second links alternately arranged;

said first distance in each of said first links is longer than said first distance in each of said second links;

said support point of each of said first links is provided by a first shaft for pivotably supporting said first links;

said support point of each of said second links is provided by a second shaft for pivotably supporting said second links, said second shaft being positioned between said first shaft and said load point;

each of said first links has a hole through which said second shaft is loosely inserted; and each of said second links has a hole through which said first shaft is loosely inserted.

8. A lapping method for lapping a row bar formed with a plurality of head sliders, comprising the steps of:

applying a force to a first end of a pivoted link in a direction substantially parallel to a lap plate to press a row tool supporting said row bar at a second opposing end of said pivoted link in a direction substantially perpendicular to said lap plate; and relatively moving said lap plate and said row tool to lap said row bar, wherein said pivoted link converts said substantially parallel force applied at said first end into said substantially perpendicular force at said second end.

9. A lapping method for lapping a row bar formed with a plurality of head sliders by pressing a row tool supporting said row bar against a lap plate, comprising the steps of:

applying a force having a direction perpendicular to said lap plate to said row tool in a plurality of holes formed in said row tool and arranged in parallel to said lap plate, each of said holes being surrounded by a slit formed in said row tool on the opposite side of said lap plate; and relatively moving said lap plate and said row tool to lap said row bar.

* * * * *